United States Patent [19]

Kelly

[11] 3,778,139

[45] Dec. 11, 1973

[54] FILM PROJECTION WITH CLEANING ATTACHMENT

[76] Inventor: Joseph Kelly, 128 Turtlecove Ln., Huntington, L. I., N.Y.

[22] Filed: Nov. 4, 1970

[21] Appl. No.: 87,006

Related U.S. Application Data

[62] Division of Ser. No. 809,620, March 24, 1969, Pat. No. 309,020.

[52] U.S. Cl. .............................................. 352/130
[51] Int. Cl. .................................................. G03c 11/00
[58] Field of Search ...................... 352/130; 15/100

[56] References Cited
UNITED STATES PATENTS

| | | | |
|---|---|---|---|
| 1,927,284 | 9/1933 | Howell | 352/130 |
| 3,422,479 | 1/1969 | Jeffe | 15/100 |
| 3,644,953 | 2/1972 | Christiansen | 15/100 |
| 1,857,633 | 5/1932 | Gramsa | 15/100 |
| 1,239,295 | 9/1917 | Noble | 352/130 |

Primary Examiner—S. Clement Swisher
Attorney—Alan K. Roberts et al.

[57] ABSTRACT

A film projector is provided with a cleaning attachment through which the film passes prior to entering the interior of the projector. The cleaning attachment includes cleaning tapes on opposite sides of the film. The tapes contact the film at spaced positions. The tapes are driven in opposite direction to that of the film.

3 Claims, 5 Drawing Figures

FIG.2
FIG.3
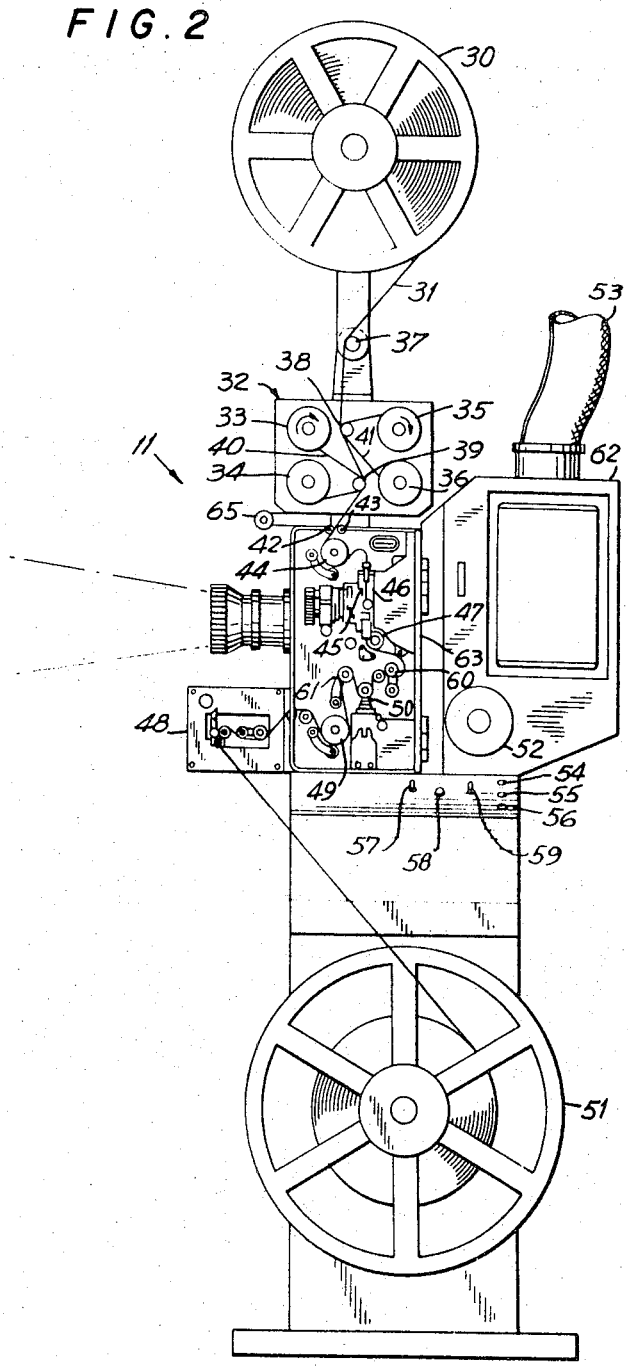
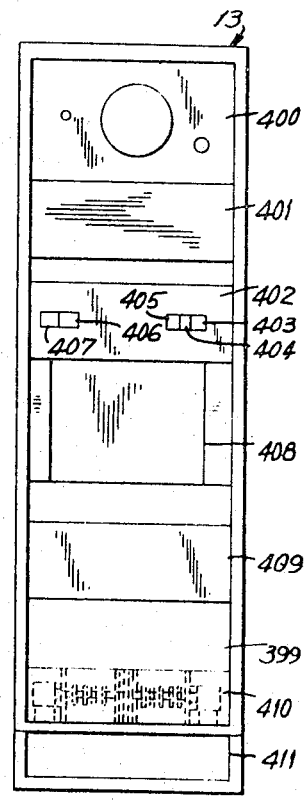

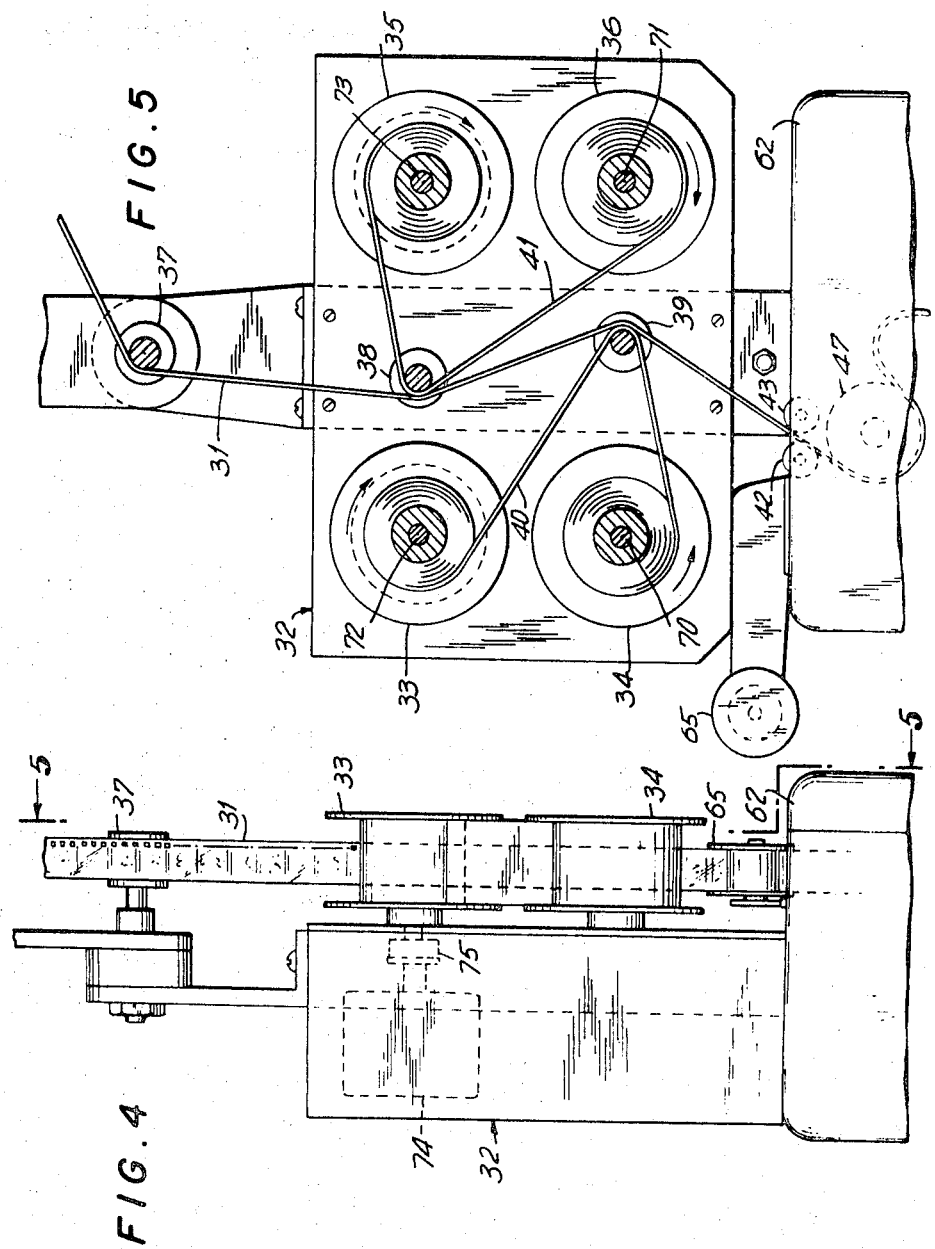

FILM PROJECTION WITH CLEANING ATTACHMENT

This application is a division of application Ser. No. 809,620 filed Mar. 24, 1969 now U.S. Pat. No. 3609020.

BACKGROUND OF THE INVENTION

1. Field of the Invention

The present invention relates to improved film projectors and to film cleaners associated therewith.

2. Description of the Prior Art

Film cleaning devices are known from U.S. Pat. Nos. 1,927,284; 3,422,479; 3,644,953; and 1,857,633. None of these film cleaning devices are used with projectors in a position upstream of the latter or in a manner suitable for preventing the passing of lint or the like into a projector.

It is an object of the invention to provide an improved projector.

It is a further object of the invention to provide an improved cleaning mechanism for the cleaning of a film which is being passed through a projector.

Still another object of the invention is to provide an improved cleaning mechanism for use with projectors which cleaning mechanism minimizes the possibility of dirt falling into the projector.

Yet another object of the invention is to provide an improved cleaning mechanism for use with a projector wherein the possibility of scratching the film due to a malfunctioning of the cleaning mechanism is minimized.

Still another object of the invention is the improvement of a cleaning mechanism for use in a projector such that the resulting assembly is suitable for use in an automated operation.

To achieve the above and other objects of the invention there is provided a film projector including a film take-up reel and a film supply reel with a film projecting means being provided for projecting a film image. A means is provided for transporting the film from the supply reel through the film projecting means to the take-up reel.

In further accordance with the invention, a cleaning means is interposed between the supply reel and film transporting means for the fluidless cleaning of film moving from the supply reel to the film transporting means.

This cleaning means comprises a first roll of cleaning tape, a second roll of cleaning tape, with first and second take-up means being provided respectively therefor. Furthermore, there is provided a means for bringing the tapes against opposite film surfaces at spaced positions and adapted for causing the film to take a sinuous path through the cleaning means. Still further, motors are provided to drive the take-up means at about 4 R.P.M. to drive the tapes in a direction opposite to that of the film.

According to a feature of the invention, coil springs and dog clutches are provided for coupling the motors through the take-up means.

According to still another feature of the invention, the aforesaid tapes are silicone treated, felt-like tapes.

In accordance with the present invention, there are provided means for cleaning the film to avoid magnification of dirt, dust and other particle images during projection.

BRIEF DESCRIPTION OF THE DRAWINGS

FIG. 2 is a side view of a projector with a cleaning attachment and cue detector of the invention associated therewith;

FIG. 3 is a front view of a components cabinet for storing elements of the system disclosed herein;

FIG. 4 is a side view of the cleaning attachment; and

FIG. 5 is a sectional view of the cleaning attachment of FIG. 4 taken along line V—V;

DETAILED DESCRIPTION

Figure 1:
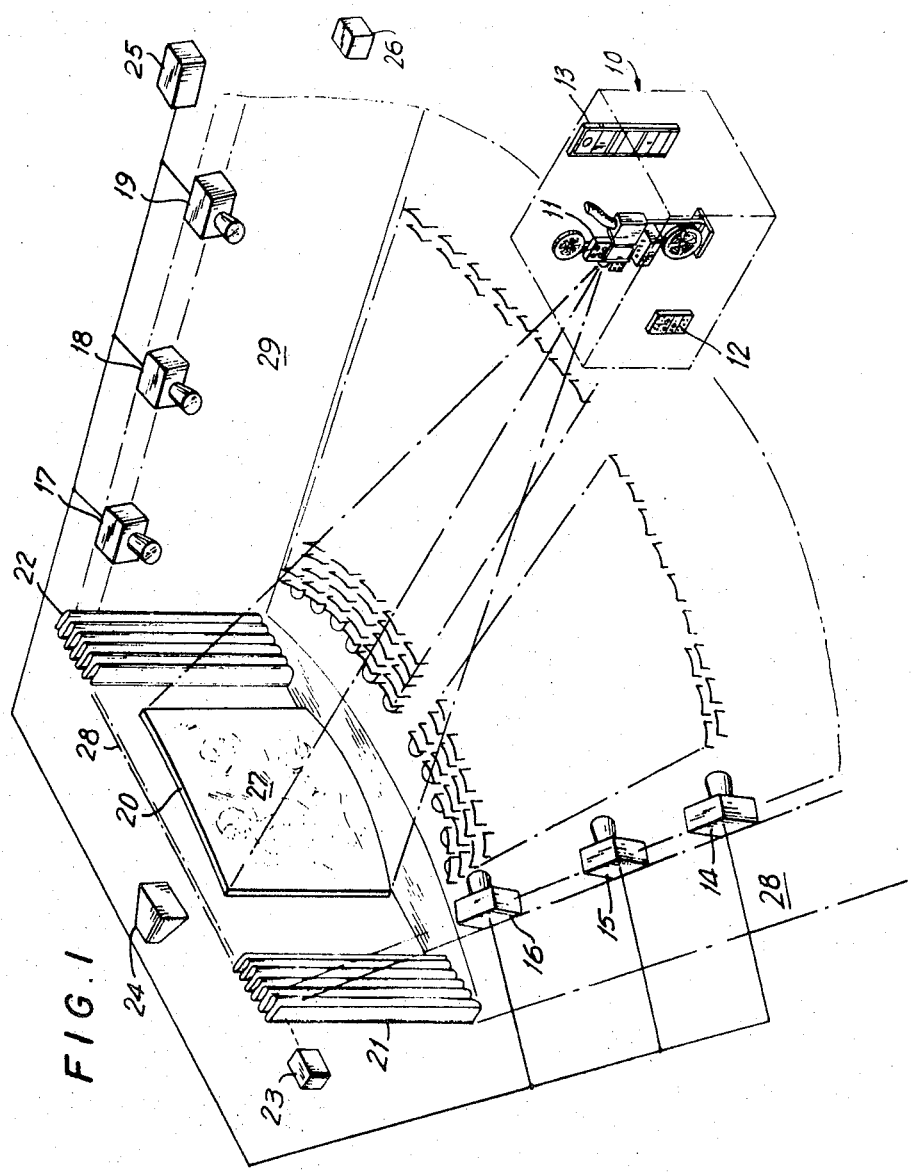
FIG. 1 is a diagrammatic representation of a theater including various components of the present invention.

FIG. 1 is a diagrammatic representation of a theater embodying various aspects of the present invention. A projection booth 10 is located in the rear of the theater in a position for displaying on a curtain 20 an image 27 beamed from a projector 11 within the booth 10. The booth 10 can be relatively small because the automated system of the present invention eliminates the need for a projectionist to be stationed continuously within the booth during the showing of a film.

A control panel 12 for the automated system of the present invention is located outside of the booth 10 or in any other part of the theater as desired, preferably at the rear thereof. The control panel 12 comprises, as will be shown, a plurality of switches for initiating operation of the automatic system and for overriding the automatic system. The panel also includes a plurality of lights for indicating the various parts of the sequences as they occur in time.

A components cabinet 13 is shown within the booth 10. The components cabinet 13 contains various circuit banks and programmer components used in carrying out various operations in accordance with the present invention.

A plurality of lights 14–19 are arranged along the upper portions of sidewalls 28 and 29 of the theater. The lights 14–19 operate under the control of a motorized dimmer device 25 such that there is provided a gradual transition of light intensity between on and off. The motorized dimmer device 25 is actuated and controlled by the automated system of the present invention. The lights 14–19 may also be positioned along the ceiling (not shown) of the theater or in any other desired location within the theater. A light override switch panel 26 may be located in any desired part of the theater, preferably at the rear thereof, to provide for manual operation of the lights in the unlikely event of a malfunction in the automated system or to account for some other type of emergency.

The screen 20 is a standard screen behind which is located a speaker 24. The speaker 24 is preferably centrally positioned behind the screen and at two-thirds the height of the screen 20. The automated system of the present invention automatically and selectively applies pre- and inter-show music or film sound to the speaker 24.

A curtain comprising curtain elements 21 and 22 is operated by a cable 28 in response to the operation of a drive motor 23 to conceal or reveal the screen 20 to the audience. The driver motor 23 may be a commercially available motor having limit switches for turning off the motor when the curtain elements 21 and 22 are at either full close or full open.

The projector 11 employed in accordance with the invention is shown in greater detail in FIG. 2. With reference to FIG. 2, a film 31 is threaded from a supply reel 30 over a roller 37 through a cleaning attachment 32, which will be described in more detail hereinafter, through a pair of rollers 42 and 43, around a drive sprocket 44 and between an adjustable pressure plate 45 and an aperture plate 46, through a stop-go Geneva movement drive sprocket 47, through a pressure roller 60, and to a sound optical system 50. From the sound optical system 50, the film 31 is passed around pressure roller 61, through a drive sprocket 49, through a drive interlock and pulse detector 48 (which will later be discussed) and to a take-up reel 51.

A door 63 for access to the interior of the projector 11 is shown in opened position. The projector also includes a projector lamp housing 62 with a blower 52 externally mounted at the lower end thereof and a vent hose 53 connected to the upper end thereof. The blower 52 drives air into the lamp housing 62 to prevent the accumulation of ozone and in order to evacuate heat from the lamp housing 62 via the ventilation hose 53. The ventilation hose 53 is preferably connected to a duct which is located over the booth 10 and connected to an exhaust blower (not shown). A roller 65 extends in forward direction from the projector 11 and is used for rewinding the film 31 back onto the supply reel 30 from the take-up reel 51.

The cleaning attachment 32 mentioned above is shown in greater detail in FIGS. 4 and 5 wherein appear two spools 34 and 36 of cleaning tape mounted on idler pins 70 and 71, respectively. The cleaning tapes may be silicon treated felt-like tapes which are commercially available for cleaning film under laboratory conditions.

The cleaning tape 40 of one of the spools 34 is threaded about a roller 39 and onto a take-up spool 33 which is mounted on a drive shaft 72. Similarly, the cleaning tape 41 of the other spool 36 is threaded about roller 38 and onto a second take-up spool 35 mounted on a second drive shaft 73.

Each of the take-up spools 33 and 35 is driven by an associated motor 74, diagrammatically shown in FIG. 4. The motors 74 drive take-up spools 33 and 35 at a relatively slow speed, preferably four revolutions per hour, through a coil spring and dog clutch 75. The motors 74 drive their respective take-up reels 33 and 35 clockwise as shown by the arrows in FIG. 5.

The film 31 is brought into contact with the cleaning tapes 41 and 40 at spaced position defined by rollers 38 and 39. The cleaning tapes 40 and 41 are, as can be seen, driven in a direction of travel opposite that of the film 31 which minimizes the possiblity of dirt falling into the projector. Separate motor drives for the take-up spools 33 and 35 are provided to permit independent operation of the cleaning tapes 40 and 41, and to lessen the possibility of one or both of the tapes binding which might result in scratching the film.

The cleaning tapes should be of a length to last for two or more showings of a film. The tapes must be replaced when there is insufficient tape remaining on spools 34 and 36 to last for an entire showing of a film.

Each of the take-up spools 33 and 35 may be provided with limit switches (not shown) for indicating when a predetermined amount of tape has been utilized.

The invention contemplates the preferred use of smaller films such as 16 mm. film whereby smaller reels can be used and supervision minimized. A problem raised by the use of 16 mm. film is that dirt, dust and other particles may be magnified to such an extent during projection that they may interfere with the clarity of the displayed picture. The aforesaid cleaning device takes care of this problem and thus contributes materially to the automation of the system.

From the above, it will be seen that in accordance with the invention there is provided a film projector comprising a film take-up reel, a film supply reel, film projecting means for projecting a film image, means for transporting film from the supply reel through the film projecting means through said take-up reel and cleaning means interposed between the supply reel and the film transporting means for the fluidless cleaning of film moving from the supply reel to the film transporting means. The cleaning means disclosed above comprises a first and second roll of cleaning tape with respective take-up means provided therefor. A device is provided for bringing the tapes against the opposite film surfaces at spaced positions to cause the film to take a sinuous path through the cleaning means. Motors are provided for driving the take-up means at a speed consistent with film projection and of about 4 R.P.M. and to drive the tapes in a direction opposite to that of the film.

There will now be obvious to those skilled in the art many modifications and variations of the construction set forth above. These modifications and variations will not depart from the scope of the invention as defined by the following claims.

What is claimed is:

1. A film projector comprising a film take-up reel, a film supply reel, film projecting means for projecting a film image, means for transporting film from said supply reel through said film projecting means to said take-up reel, and cleaning means interposed between said supply reel and said film transporting means for the fluidless cleaning of film moving from said supply reel to said film transporting means, said cleaning means comprising a first roll of cleaning tape, a second roll of cleaning tape, a first take-up means for receiving the tape from said first roll, a second take-up means for receiving the tape from said second roll, means for bringing the tapes against opposite film surfaces at spaced positions and for causing the film to take a sinuous path through said cleaning means, and motors to drive the take-up means at about 4 R.P.M. to drive the tapes in a direction opposite that of the film.

2. A projector as claimed in claim 1 comprising coil springs and dog clutches coupling the motors to the take-up means.

3. A projector as claimed in claim 2 wherein the tapes are silicone treated felt-like tapes.

* * * * *